United States Patent [19]
True

[11] Patent Number: 4,837,965
[45] Date of Patent: Jun. 13, 1989

[54] ICE FISHING TIP-UP

[76] Inventor: Donovan B. True, 5509 Lake Rd., Oshkosh, Wis. 54901

[21] Appl. No.: 181,485

[22] Filed: Apr. 14, 1988

[51] Int. Cl.⁴ .............................................. A01K 97/12
[52] U.S. Cl. ........................................................ 43/17
[58] Field of Search ................................. 43/15, 16, 17

[56] References Cited

U.S. PATENT DOCUMENTS

| 3,309,808 | 3/1967 | George | 43/15 |
| 3,603,017 | 9/1971 | Happe | 43/17 |
| 4,161,839 | 7/1979 | Ward | 43/17 |
| 4,217,720 | 8/1980 | Karr | 43/17 |
| 4,620,387 | 11/1986 | Bloom | 43/15 |
| 4,730,408 | 3/1988 | Miller | 43/16 |

Primary Examiner—M. Jordan

[57] ABSTRACT

An ice fishing tip-up utilizes a conventional rod and reel in a pivotal mounting to provide the tipping action. The rod and reel may be quickly and easily removed from the pivotal mounting to enable the rod and reel to be used in a conventional manner to hook and land a fish.

9 Claims, 1 Drawing Sheet

ICE FISHING TIP-UP

BACKGROUND OF THE INVENTION

The present invention relates to an ice fishing tip-up and, more particularly, to an improved tip-up which utilizes a conventional rod and reel combination that is demountable from the tip-up base.

In using prior art ice fishing tip-ups, a fish bite is signalled by mechanical means sensed by sight or hearing. Hooking and landing the fish which triggered the mechanical device is accomplished by grasping the fish line, jerking it upward to set the hook, and then pulling in the fish with a hand-over-hand action on the line. The angler is disadvantaged by such tip-ups owing to the time it takes to gain a firm and unobstructed grip on the fishing line once a fish bite has been signalled and before the fish drops the bait. He is further disadvantaged by the lack of speed by which the hand held line can be jerked upward, as opposed to the speed available to the angler who has the advantage of the lever arm provided when a fishing rod is employed. Once a fish is hooked, the ice fisherman is still further disadvantaged by his inability to "play" the fish by the give and take of line which is necessary to prevent line breakage and which is so well accommodated by a fishing rod and reel.

SUMMARY OF THE INVENTION

The ice fishing tip-up of the present invention includes a supporting base having an upwardly extending support arm to the upper end of which is attached a conventional rod and reel combination, the rod preferably being of the short type commonly used when ice fishing without a tip-up. The rod and reel combination is demountably attached to the support arm with a pivot means that allows the rod to be set and held in a normally substantially horizontal position, but which will allow the end of the rod to rotate downwardly as a result of a downward force thereon, such as the pull of fish on the line extending down from the end of the rod.

In the preferred embodiment of the invention, the pivot means comprises a pivot pin extending through the rod normal to its axis and an upwardly opening notch in the support arm to receive the pivot pin and support the rod and reel for rotation. The position of the pivot pin is also preferably adjustable along the axis of the rod to enable selection of a pivot point most appropriate for the fishing tackle utilized and for maintenance of the normally horizontal set position of the rod. The support arm may also include stops which are engageable by the rod to assist in maintaining the normally horizontal set position and to limit the extent of rotation of the rod end to the down position. Visual indicia on the handle of the rod, which rotates up as the opposite end rotates down under the influence of a fish bite, provides enhanced means for detecting the bite.

The ability to lift the rod and reel from its pivot in the notch in the support arm allows the angler to quickly set the hook in a more efficient manner and without having to grasp the line by hand and allows the angler to use the fishing rod and reel to play the fish. The upwardly opening notch prevents an unattended fishing rod from being pulled inadvertantly from the support arm and beneath the ice.

DETAILED DESCRIPTION OF THE PREFERRED EMBODIMENT

Figure 3:
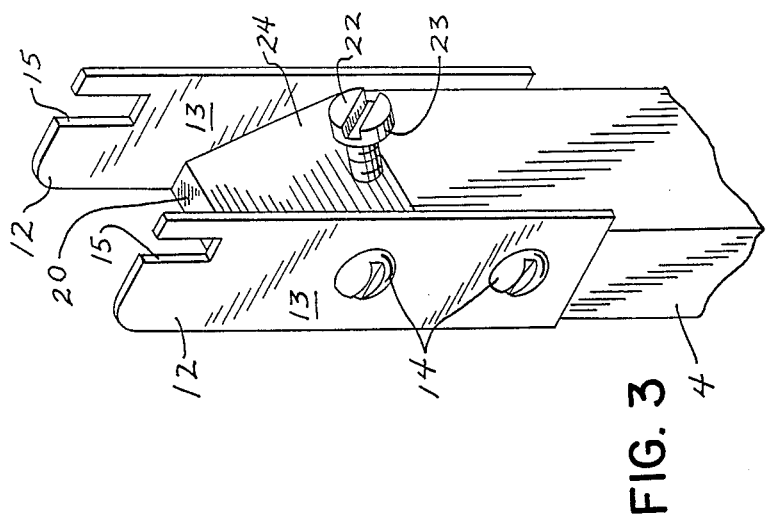
FIG. 3 is an enlarged perspective view of the upper end of the support arm of the tip-up.

In the drawing, an ice fishing tip-up 1 includes a supporting base 2 comprising a pair of base members 3 attached at one of their ends to form a V-shaped base. Between the attached ends of the base members 3 and extending upwardly therefrom is a support arm 4. A conventional rod and reel combination 5 is demountably supported on the upper end of the support arm for limited rotational movement, as will be described in more detail hereinafter.

The rod and reel combination 5 may conveniently comprise a more or less conventional assembly commonly used by fishermen instead of a tip-up for angling directly through a hole in the ice. Thus, the rod 6 includes a short flexible rod end 7 and a rigid handle 8. A reel 9 is attached to the handle 8 near the point of attachment between the handle and the rod end 7. A conventional ferrule 10 is mounted to the end of the rod to guide the fish line 11 extending from the reel.

The upper end of the support arm 4 is bifurcated to define a pair of spaced legs 12. The legs are spaced by a distance sufficient to allow the handle 8 of the rod 6 to be received therebetween. In the embodiment shown, each leg 12 comprises a thin metal plate 13 which is attached to an opposite side of the support arm as with screws 14 and extends upwardly beyond the end of the support arm. Each of the plates 13 also includes an upwardly opening notch 15.

A pivot pin 16 is inserted through one of a series of through-bored holes 17 in the handle 8 of the rod. The holes 17 are parallel and extend perpendicular to the axis of the rod. The pivot pin 16 may be selectively inserted into any one of the holes 17 which are preferably bores slightly undersize to hold the pivot pin snuggly therein. The pivot pin may alternatively comprise, for example, a rod handle-encircling spring member (not shown) having axially aligned pin protrusions extending from opposite sides of the handle. Slight opening of the spring member would allow adjustment of the pivot position.

The rod and reel combination 5 with the attached pivot pin 16 is adapted to be placed between the legs 12 of the support arm with the ends of the pivot pin 16 resting in the notches 15. When so mounted, the rod and reel combination 5 is rotatable about the axis of the pivot pin from a first set position in which the rod is substantially horizontal to a second "tipped-up" position with the tip of the rod rotated downwardly and the handle 8 upwardly as a result of the pull by a fish on the line 11.

Figure 1:
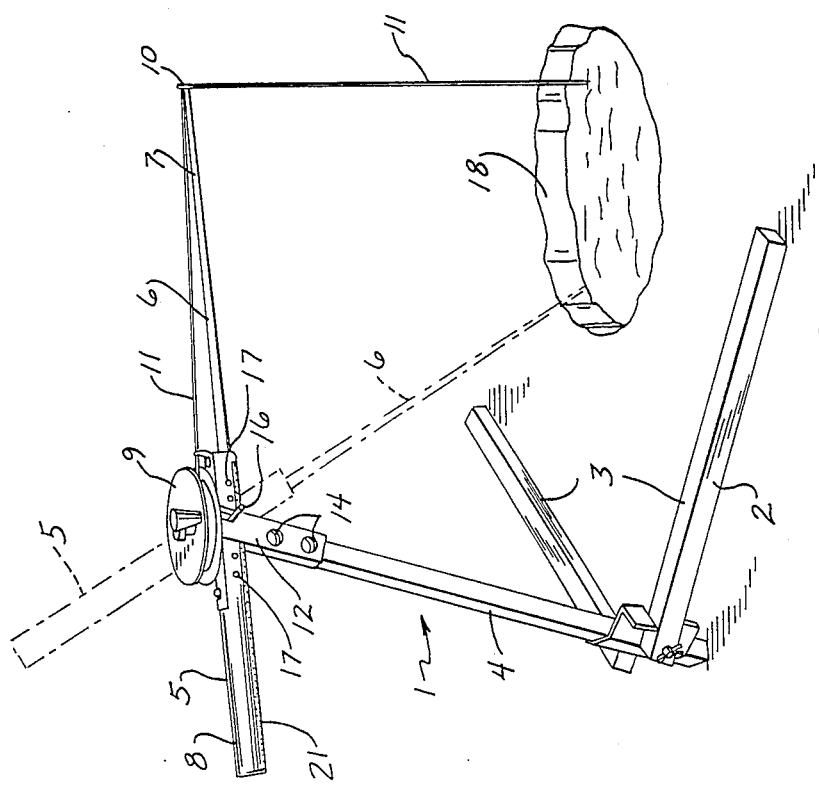
FIG. 1 is a perspective view of the tip-up of the present invention in its operative position with respect to an ice fishing hole.
Figure 2:
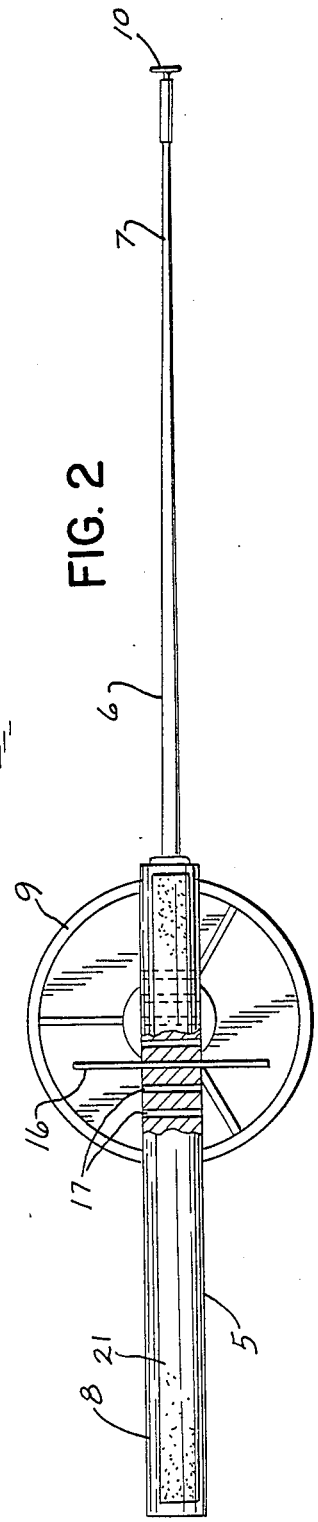
FIG. 2 is a bottom plan view of the rod and reel combination used with the tip-up shown in FIG. 1.

In use and as may best be seen in FIG. 1, the tip-up 1 is placed on the ice with the base members 3 stradling the hole 18 in the ice, such that with the rod 6 set in the horizontal position, the fish line 11 will depend downwardly from the tip of the rod end 7 directly into the hole 18 in the ice. To maintain the rod in the substantially horizontal set position, the handle 8 provides a counterbalance to the weight of the rod end of the assembly including the line and line attachments, such as sinkers, lures, and bait. The pivot pin 16 is inserted in one of the through-bored holes 17 such that there is a slight overbalance on the handle end tending to rotate the handle downwardly in a direction opposite the rotation from the first (substantially horizontal) position to the second (tipped-up) position. To prevent such opposite or reverse rotation and permit the rod to be maintained in the substantially horizontal position, the edge 20 of the support arm 4 between the legs 12 acts as a stop which is engageable by the underside of the handle to prevent rotation of the rod in that direction from the substantially horizontal position. It should be understood that it is also possible to provide the overbalance needed to maintain the rod handle in engagement with the edge 20 of the support arm by adding a weight to the handle, rather than changing the position of the pivot pin 16.

The additional downward force exerted on the line 11 by a fish taking the bait or lure will overcome the normal overbalance described above and cause the end of the rod to pivot downwardly toward the hole to the dashed line second position shown in FIG. 1. The corresponding upward rotation of the handle 8 constitutes the "tip-up" signal to the fisherman. To enhance the visual tip-up signal, a brightly colored strip 21 may be attached to the underside of the handle. The tip-up is preferably positioned so that the fisherman is located generally or or near a line extending along the rod axis away from the handle. The colored strip 21 is thus most readily discernable to the fisherman only when the handle moves to a tipped-up position.

As the end of the rod tips downwardly under the added line tension imposed by a fish taking the bait, the rotation of the rod end about the pivot pin 16 will also result in movement of the rod and the downwardly depending line 11 toward the support arm 4 and the edge of the hole 18 on the ice. Rotation in this direction is limited by engagement between the underside of the handle 8 and the stop surface 22 at the top of the support arm 4 between the legs 12. As shown, the stop surface 22 may conveniently comprise the head of a bolt or screw 23 threaded into the angled surface 24 of the upper end of the support arm.

When a fish has taken the bait and caused the rod and reel to "tip-up", the fisherman may simply grasp the handle of the rod, lift it from the notches 15, set the hook and reel in or play the fish as one would normally do with a rod and reel. There is no part of the tip-up assembly which must be lifted or moved out of an obstructive position, nor is the fisherman required to utilize the disadvantageous hand-over-hand method of setting the hook, playing the fish, and pulling it in. The apparatus of the present invention permits extremely quick response to a bite which, in many cases, may permit the fisherman to set the hook before the bait is dropped by the fish.

The notches 15 in the legs 12 for receipt of the ends of the pivot pin 16 should have sufficient depth to securely hold the rod and reel therein in either the horizontal or tipped-up position. In particular, the notches should be deep enough to allow some slight bouncing of the rod and vertical movement of the pivot pin in the notches, as might result from a fish jerking on the line.

I claim:
1. An ice-fishing tip-up comprising:
   (a) a supporting base;
   (b) a support attached to and extending upwardly from the base;
   (c) a rod and reel combination having one end of the rod extending outwardly from the support for supporting a fishing line and having a weight distribution which causes the rod and reel combination to rotate from a horizontal resting position to a more vertical resting position once downward movement of the outwardly extending rod end is initiated;
   (d) pivot means for demountably attaching the rod and reel combination to the support for rotation about an axis normal to the axis of the rod;
   (e) said pivot means positioned to hold the rod and reel combination about the axis of the pivot means to a second position in response to a downward force on the rod; and
   (f) the support base further including an extension in a plane generally parallel to the axis of the rod and extending outward from the support in a direction generally from the base toward the end of the rod to maintain the support upright when a downward force is applied to the end of the rod.

2. The apparatus as set forth in claim 1 wherein the pivot means comprises:
   (a) a pivot pin attached to the rod; and
   (b) upwardly opening notch means in the support for receipt of the pivot pin.

3. The apparatus as set forth in claim 2 wherein the support includes a bifurcated upper end defining a pair of spaced legs for receipt of the rod therebetween, and the notch means comprises a notch in each of the spaced legs.

4. The apparatus as set forth in claim 3 wherein the pivot means further includes first stop means for engaging the rod to prevent rotation of the rod and reel combination in a direction opposite the rotation from said first position to said second position.

5. The apparatus as set forth in claim 3 wherein the pivot means further includes second stop means for engaging the rod to limit rotation of the rod and reel combination to said second position.

6. The apparatus as set forth in claim 4 wherein said first stop means comprises a first bearing surface on the support between the spaced legs.

7. The apparatus as set forth in claim 6 wherein the axis of the pivot means is positioned to effect an overbalance in said opposite direction sufficient to normally maintain the rod in engagement with the first stop means.

8. The apparatus as set forth in claim 7 wherein the pivot means is adjustable to permit selective positioning of the axis thereof along the axis of the rod.

9. The apparatus as set forth in claim 5 including visual indicia on the handle of the rod adapted to provide an indication of rotational movement of the rod to said second position.

* * * * *